(12) United States Patent
Foster

(10) Patent No.: US 7,513,775 B2
(45) Date of Patent: Apr. 7, 2009

(54) PRESENTING ANSWER OPTIONS TO MULTIPLE-CHOICE QUESTIONS DURING ADMINISTRATION OF A COMPUTERIZED TEST

(75) Inventor: David F. Foster, East Lindon, UT (US)

(73) Assignee: Exam Innovations, Inc., Alpine, UT (US)

( * ) Notice: Subject to any disclaimer, the term of this patent is extended or adjusted under 35 U.S.C. 154(b) by 76 days.

(21) Appl. No.: 11/538,385

(22) Filed: Oct. 3, 2006

(65) Prior Publication Data

US 2007/0166686 A1    Jul. 19, 2007

Related U.S. Application Data

(60) Provisional application No. 60/723,830, filed on Oct. 5, 2005.

(51) Int. Cl.
G09B 11/00 (2006.01)
(52) U.S. Cl. .................................. 434/323; 434/365
(58) Field of Classification Search .................. 434/322, 434/323, 350, 353, 362
See application file for complete search history.

(56) References Cited

U.S. PATENT DOCUMENTS

| | | | |
|---|---|---|---|
| 5,586,889 A * | 12/1996 | Goodman | 434/327 |
| 5,727,950 A | 3/1998 | Cook et al. | |
| 5,827,070 A | 10/1998 | Kershaw et al. | |
| 5,841,655 A | 11/1998 | Stocking et al. | |
| 5,915,973 A | 6/1999 | Hoehn-Saric et al. | |
| 5,944,530 A | 8/1999 | Ho et al. | |
| 5,947,747 A | 9/1999 | Walker | |
| 6,024,577 A | 2/2000 | Wadahama et al. | |
| 6,077,085 A * | 6/2000 | Parry et al. | 434/322 |
| 6,086,382 A * | 7/2000 | Thomas | 434/323 |
| 6,112,049 A * | 8/2000 | Sonnenfeld | 434/350 |
| 6,120,297 A * | 9/2000 | Morse et al. | 434/169 |
| 6,208,746 B1 | 3/2001 | Musgrave | |
| 6,511,326 B1 * | 1/2003 | Galanter et al. | 434/322 |
| 6,513,014 B1 | 1/2003 | Walker et al. | |
| 6,699,043 B2 | 3/2004 | Ho et al. | |

(Continued)

FOREIGN PATENT DOCUMENTS

WO    WO 2007/024685    3/2007

(Continued)

OTHER PUBLICATIONS

U.S. Appl. No. 11/207,497, filed Aug. 19, 2005, Maynes et al.

(Continued)

*Primary Examiner*—Kathleen Mosser
(74) *Attorney, Agent, or Firm*—Workman Nydegger

(57) ABSTRACT

Embodiments of the present invention are directed to presenting a multiple-choice question during delivery of a computerized test. Answer options corresponding to a multiple-choice test question prompt are presented serially either individually or in groups at a time in accordance with pre-established rules. Answer options can be presented randomly or staged. Staged presentation can be performed in accordance with a predefined selection algorithm and/or based on analysis of prior answer option selections from the same or previous questions. Questions end when a question end condition, such as, for example, selection of a plurality of incorrect answers or selection of a correct answer, is satisfied.

17 Claims, 4 Drawing Sheets

U.S. PATENT DOCUMENTS

| | | | |
|---|---|---|---|
| 6,986,664 B1 * | 1/2006 | Thomas | 434/322 |
| 6,999,714 B2 | 2/2006 | Pfenninger et al. | |
| 7,165,012 B2 | 1/2007 | Swanson | |
| 7,181,158 B2 * | 2/2007 | Heller et al. | 434/362 |
| 7,231,657 B2 | 6/2007 | Honarvar | |
| 2002/0197595 A1 | 12/2002 | Hoyashita et al. | |
| 2003/0044760 A1 | 3/2003 | Banerjee | |
| 2004/0111305 A1 | 6/2004 | Gavan et al. | |
| 2004/0187037 A1 | 9/2004 | Checco | |
| 2004/0213437 A1 | 10/2004 | Howard et al. | |
| 2004/0229199 A1 | 11/2004 | Ashley | |
| 2004/0234936 A1 * | 11/2004 | Ullman et al. | 434/322 |
| 2004/0267500 A1 | 12/2004 | Gedlinske et al. | |
| 2006/0161371 A1 | 7/2006 | Swanson | |

FOREIGN PATENT DOCUMENTS

| | | |
|---|---|---|
| WO | WO 2007/044431 | 4/2007 |

OTHER PUBLICATIONS

U.S. Appl. No. 11/338,372, filed Jan. 24, 2006, Maynes et al.

U.S. Appl. No. 11/465,070, filed Aug. 16, 2006, Brewer et al.

Office Action dated Oct. 24, 2007, from U.S. Appl. No. 11/338,372, 5 pages.

Office Action dated May 4, 2007, from U.S. Appl. No. 11/338,372, 13 pages.

Office Action dated Aug. 7, 2007, from U.S. Appl. No. 11/465,070, 28 pages.

International Search Report and Written Opinion from PCT/US2006/038881, dated Apr. 4, 2008, 10 pages.

Angoff, William H, The Development of Stastical Indices for Detecting Cheaters, Jul. 1972, Educational Testing Service, 24 Pages.

Sheridan, D. & Witherden, S. (2004). "Detecting Cheaters using a Learning Management System" In L. Cantoni & C. McLoughlin (Eds.), Proceedings of World Conference on Educational Multimedia, Hypermedia and Telecommunications 2004 (pp. 3749-3754).

Ex Parte Quayle Action dated Apr. 9, 2008 cited in U.S. Appl. No. 11/338,372.

Notice of Allowance dated Jun. 11, 2008 cited in U.S. Appl. No. 11/338,372.

* cited by examiner

PRESENTING ANSWER OPTIONS TO MULTIPLE-CHOICE QUESTIONS DURING ADMINISTRATION OF A COMPUTERIZED TEST

CROSS-REFERENCE TO RELATED APPLICATIONS

The present application claims priority from U.S. provisional patent application Ser. No. 60/723,830 filed Oct. 5, 2005, and entitled "Staging Display Of Answer Options To Multiple Choice Questions During Administration Of A Computerized Test", which provisional application is incorporated herein by reference in its entirety.

BACKGROUND

Background and Relevant Technology

Computer systems and related technology affect many aspects of society. Indeed, the computer system's ability to process and communicate information has transformed the way we live and work. Many standardized tests now are also administered on computers. Computerized, standardized tests (e.g., USMLE, GRE, LSAT, GMAT, hundreds of certification exams etc.) typically include one or more multiple-choice questions, consisting of a question prompt and two or more answer options, which are displayed simultaneously.

The present method of displaying multiple-choice question prompts and all of the answer options simultaneously erodes the measurement validity and security of multiple-choice questions.

For example, by comparing answer options, test-takers can, by a process of elimination based on the relative plausibility of each answer option, identify the correct response without having positive knowledge that the response is correct. Poor quality prompts and answer options exaggerate this effect by making the correct response more obvious.

If a test-taker is able to eliminate some of the answer options, but is still uncertain of the correct answer, they may guess from the remaining acceptable answer options, sometimes estimating their chance of selecting the correct answer by guessing (30% for example, if on a question with five answer options, they are able to eliminate two options).

Further, when a multiple-choice question prompt and all the answer options are displayed simultaneously, the entire item can be quickly memorized or recorded, for example, with a digital camera. Mispropriated test question information can be researched to identify the correct answer option, quickly shared with other test-takers, and used during subsequent administrations of the same test.

BRIEF SUMMARY OF THE INVENTION

Embodiments of the present invention provide for presenting a multiple-choice question including a question prompt and answer options, during delivery of a computerized test. A processor accesses a multiple-choice question prompt from a question repository. The processor accesses pre-established rules governing the presentation of a maximum number of answer options to be presented along with the multiple-choice question prompt. The pre-established rules govern at least one of: the number and ordering of answer options presented simultaneously with the multiple-choice question prompt, the number of additional answer options to be displayed when test-taker input indicating selection of a correct, partially correct, or incorrect answer option is received, and one or more question end conditions indicating when to end a multiple-choice question based on test-taker input.

The processor selects, from the question repository, a plurality of answer options corresponding to the multiple-choice question prompt. At least some of the selected plurality of answer options is to be presented as possible answers to the multiple-choice question prompt in accordance with the pre-established rules. The processor simultaneously presents the multiple-choice question prompt along with a first one or more of the selected answer options at the display device in accordance with the pre-established rules.

The processor receives test-taker input indicating that an answer option from among the first one or more simultaneously presented answer options has been selected as: a correct answer to the multiple-choice question prompt, a partially correct answer to the answer multiple-choice question prompt, or an incorrect answer to the multiple-choice question prompt. The processor records the test-taker input of the answer option selection from among the first one or more simultaneously presented answer options. The processor alters the presentation of the first one or more simultaneously presented answer options in response to the test-taker input.

The processor simultaneously presents the multiple-choice question prompt along with a second different one or more of the selected answer options at the display device in accordance with the pre-established rules. The processor receives test-taker input indicating that an answer option from among the second one or more simultaneously presented answer options has been selected as: a correct answer to the multiple-choice question prompt, a partially correct answer to the multiple-choice question prompt, and an incorrect answer to the multiple-choice question prompt. The processor records the test-taker input of the answer option selection from among the second one or more simultaneously presented answer options. The processor alters the presentation of the second one or more simultaneously presented answer options in response to test-taker input.

The processor, subsequent to receiving test-taker input indicating a selection from among the second one or more simultaneously presented answer options, detects that a question end condition has been satisfied. The processor ends the multiple-choice question in response to detection of the question end condition being satisfied.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
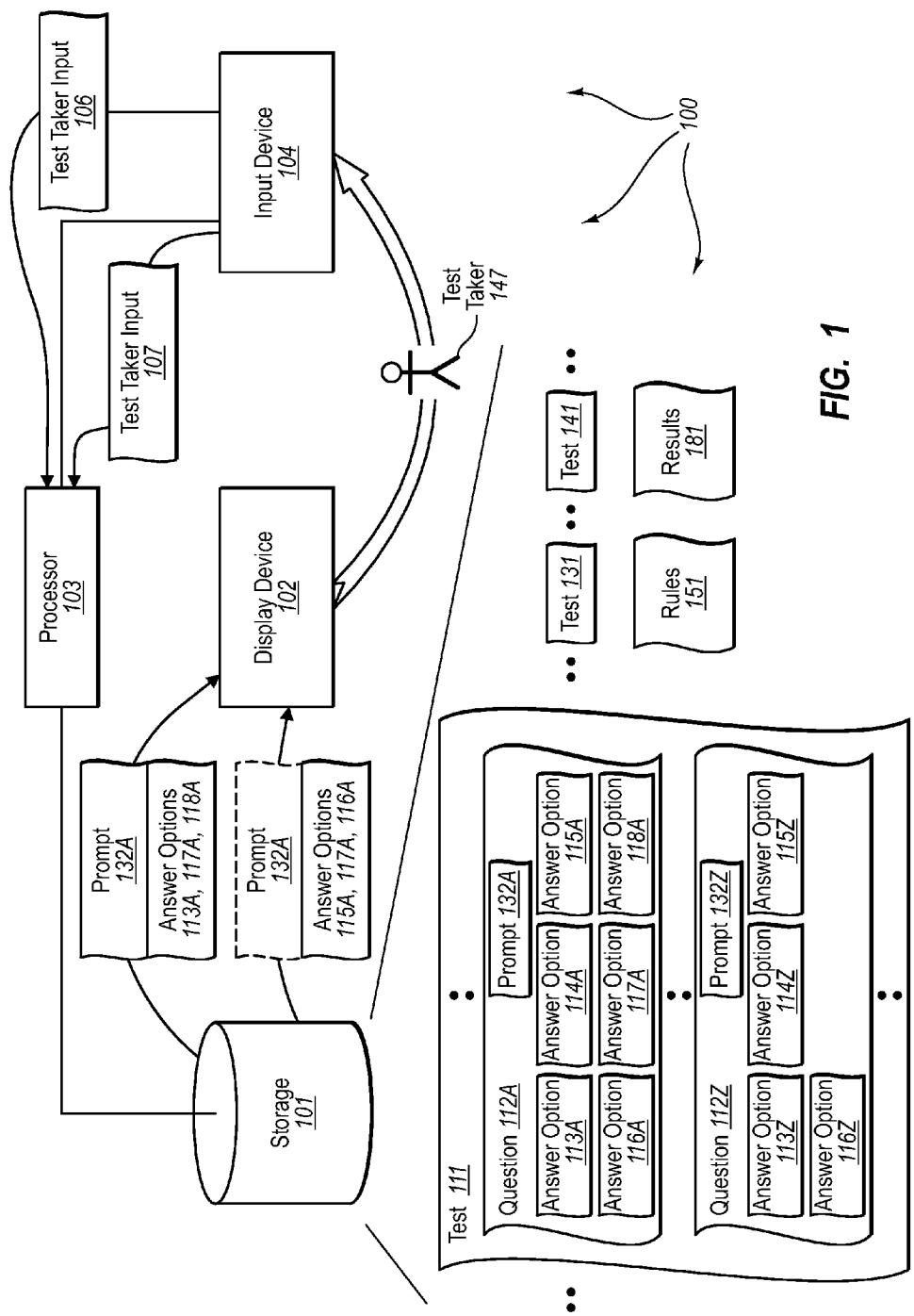
FIG. 1 illustrates an example of a computer architecture that facilitates presenting a multiple-choice question during delivery of a computerized test.

The principles of the present invention provide for presenting a multiple-choice question including a question prompt and answer options, during delivery of a computerized test. A processor accesses a multiple-choice question prompt from a question repository. The processor accesses pre-established rules governing the presentation of a maximum number of answer options to be presented along with the multiple-choice question prompt. The pre-established rules govern at least one of: the number and ordering of answer options presented simultaneously with the multiple-choice question prompt, the number of additional answer options to be displayed when test-taker input indicating selection of a correct, partially correct, or incorrect answer option is received, and one or more question end conditions indicating when to end a multiple-choice question based on test-taker input.

The processor selects, from the question repository, a plurality of answer options corresponding to the multiple-choice question prompt. At least some of the selected plurality of answer options is to be presented as possible answers to the multiple-choice question prompt in accordance with the pre-established rules. The processor simultaneously presents the multiple-choice question prompt along with a first one or more of the selected answer options at the display device in accordance with the pre-established rules.

The processor receives test-taker input indicating that an answer option from among the first one or more simultaneously presented answer options has been selected as: a correct answer to the multiple-choice question prompt, a partially correct answer to the answer multiple-choice question prompt, or an incorrect answer to the multiple-choice question prompt. The processor records the test-taker input of the answer option selection from among the first one or more simultaneously presented answer options. The processor alters the presentation of the first one or more simultaneously presented answer options in response to the test-taker input.

The processor simultaneously presents the multiple-choice question prompt along with a second different one or more of the selected answer options at the display device in accordance with the pre-established rules. The processor receives test-taker input indicating that an answer option from among the second one or more simultaneously presented answer options has been selected as: a correct answer to the multiple-choice question prompt, a partially correct answer to the answer multiple-choice question prompt, and an incorrect answer to the multiple-choice question prompt. The processor records the test-taker input of the answer option selection from among the second one or more simultaneously presented answer options. The processor alters the presentation of the second one or more simultaneously presented answer options in response to test-taker input.

The processor, subsequent to receiving test-taker input indicating a selection from among the second one or more simultaneously presented answer options, detects that a question end condition has been satisfied. The processor ends the multiple-choice question in response to detection of the question end condition being satisfied.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other physical medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates presenting a multiple-choice question during delivery of a computerized test. In some embodiments, the components of computer architecture 100 are included in a stand alone computer system. Alternately, the components of computer architecture 100 can be included in a distributed computing system (e.g., a network) with various components at different computer systems. The components of computer architecture 100 may be connected to internal and/or external peripheral devices, such as, for example, printers, disk drives, scanners, speakers, monitors, etc.

Depicted in computer architecture 100 is storage 101, display 102, processor 103, and input device 104, which can be components of a general or special-purpose computer system. The computer system can be inter-connected via one or more networks, such as, for example, Local Area Networks ("LANs"), Wide Area Network ("WANs"), and even the Internet, to other computer systems. Accordingly, the computer system, as well as other connected computer systems, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the networks.

Thus, embodiments of the present invention can use networked devices and devices connected over the Internet, wherein the Internet is used as the communication mechanism to display multiple-choice questions. A multiple choice question can include a multiple-choice question prompt (e.g., prompt 132A) and corresponding answer options (e.g., answers options 113A, 114A, 115A, 116A, 117A, and 118A). Accordingly, the question prompts and answer options can be stored on a local machine or delivered (e.g., in sets, one-by-one, etc) over a network (e.g., the Internet) from servers.

As depicted in computer architecture 100, storage 101 stores tests 111, 131, and, 141. A horizontal series of two periods (an ellipsis) before, after, and between tests 111, 131, and, 141 represents that other tests can be stored in storage 101. Each test stored in storage 101 can include one or more multiple-choice questions (in addition to other types of questions, such as, for example, TRUE/FALSE, fill in the blank, etc). As depicted, test 111 includes at least questions 112A through 112Z. However, virtually any number of questions can be included in a test. A vertical series of two periods (an vertical ellipsis) before, after, and between questions 112A and 112Z represents that other questions can be included in test 111. Other questions may or may not be multiple-choice questions.

Each multiple-choice question prompt can have one or more corresponding answer options that can be presented as possible answers to the questions. For example, answer options 113A, 114A, 115A, 116A, 117A, and 118A represent possible answers to prompt 132A. However, multiple-choice questions need not have the same number of possible answers. For example, answer options 113Z, 114Z, 115Z, and 116Z, represent possible answers to prompt 132Z.

Embodiments of the present invention can include answer options representing answers that are neither correct nor incorrect absolutely, but partially correct. Choosing such an answer would increase the test taker's score by a predetermined amount. Thus, scoring is not limited to absolutely correct or absolutely incorrect for a question.

At least one corresponding answer option can represent a correct or partially correct answer for a multiple-choice question prompt. Thus, at least one of the answer options 113A, 114A, 115A, 116A, 117A, and 118A represents a correct or partially correct answer to prompt 132A. Any answer options not representing a correct or partially answer to prompt 132A, instead represent an incorrect answer to prompt 132A (e.g., a distractor). Thus, for example, if answer option 115A represents a correct or partially correct answer to prompt 132A, then answer options 113A, 114A, 116A, 117A, and 118A would represent incorrect answers to prompt 132A.

Although test 111 depicts answer options included in corresponding questions, answer options can be stored external to questions. For example, it may be that a question only includes answer options representing correct or partially correct answers. Incorrect answers may be stored in an answer option pool and retrieved from the answer option pool as needed.

Generally, pre-established rules govern presentation of the maximum number of answer options to be presented along with a multiple-choice question prompt. Pre-established rules can be applicable to a single test (e.g., test-specific) or to a plurality of tests. Thus, for a plurality of different tests, it may be that one or more pre-established rules are utilized to govern presentation of answer options along with a multiple-choice question prompt. Accordingly, some pre-established rules can govern a single test and other pre-established rules can govern a sub-plurality of the tests. For example, in computer architecture 100, rules 151 can govern presentation of one or more of tests 111, 131, and 141.

Generally, pre-established rules can be used to govern the number and ordering of answer options presented simultaneously with a multiple-choice answer prompt. Answer options can be presented individually or in groups at a time.

Pre-established rules can govern the number and ordering of answer options presented simultaneously with the multiple-choice question prompt. For example, rules 151 can govern how many answer options (e.g., from among 113A, 114A, 115A, 116A, 117A, and 118A) are to be displayed simultaneously along with prompt 132A and the order in which the answer options are to be displayed. Thus, for example, rules 151 can indicate that answer options for prompt 132A are to be presented as two separate groups of three. Thus, it may be that answer options 113A, 116A, and 117A are presented in a first group and answer options 114A, 115A, and 118A are presented in a second group.

Different individual answer options and/or groups of answer options can be presented serially. For example, a first group can be presented along with a multiple-choice answer prompt and then subsequently a second group can be presented along with the multiple-choice answer prompt. When presenting the second group, the first group can be removed from the screen.

In alternate embodiments, the second group can be presented simultaneously with the first group. In these alternate embodiments, various different graphical alterations can be applied to the first group to indicate that the first group is not the group currently up for selection and/or to visually reduce the importance of the first group. For example, the first group can be presented in a smaller font, presented in a different color font, grayed out, moved to a lower portion of a display device, etc. Further, answer options from the first group may be only partially retained. For example, some answer options can be removed while others (e.g., a test taker selected answer option) are retained on the display device.

The number of serially presented answer options for a question can vary. That is, there is no requirement that the same number of answer options be used to replace a previously presented number of presented options. For example, for question 112A, answer options 113A, 114, and 115A can be presented as a first group of answer options and subsequently answer options 116A and 117A can be presented as a second group of answer options. Alternately, answer option 118A can be presented individually to replace answer options 113A, 114, and 115A.

Pre-established rules can govern the number of additional answer options to be displayed when test taker input indicating selection of a correct, partially correct, or incorrect answer option is received. That is, the number of additional answer options to serially present (e.g., in a second group of answer options) can be based on received test taker input (e.g., from test taker 147) indicating selection of a correct, partially correct, or incorrect answer option (e.g., from a first group of answer options). For example, rules 151 can indicate a first number of additional answer options are to be presented in response to selection of a correct answer option, a second number of additional answer options are to be presented in response to selection of a correct answer option, and third number of additional answer options are to be presented in response to selection of a correct answer option.

Each of the first, second, and third number of additional answer options can differ. For example, rules 151 can indicate that selection of a correct answer option results in three additional answer options being presented, selection of a partially correct answer option results in four additional answer options being presented, and selection of an incorrect answer results in six additional answer options being presented. Alternately, two or more of the first, second, and third number of additional answer options can be the same. For example, rules 151 can indicate that selection of a correct or partially correct answer option results in two additional answer options being presented. Accordingly, appropriately configured parameters (e.g., in rules 151) can be used to determine the presentation of answer options.

The order of presentation of answer options and/or groups of answer options can be selected randomly or "staged". For example, rules 151 can indicate that answer options and/or groups of answer options for questions of test 111 are to be selected randomly and/or staged. Random selection and staging can be implemented on a per question basis.

In some embodiments, presentation of different sets of answer options is staged in accordance with a pre-defined option selection algorithm. For example, rules 151 can include a pre-defined option selection algorithm for selecting answer options for questions of test 111.

Staging the presentation of different sets of answer options can be also based on analysis of test taker responses to previously presented questions and/or answer options. For example, rules 151 can include functionality for staging the presentation of different sets of answer options for test 111 based on analysis of test taker responses to questions and/or answer options presented during administration of test 111.

In some embodiments, selected answer options (from test taker responses) for previous multiple-choice question prompts are used as input to determine answer options for subsequently presented different multiple-choice question prompts (adaptive testing). For example, selected answer options for prompt 132A can be used as input to determine presented answer options for multiple-choice question prompts presented after prompt 132 (e.g., prompt 132Z). In other embodiments, selected answer options from one or more previously presented sets of answer options for a multiple-choice question prompt are used as input to determine answer options for any subsequently presented sets of answer options for the same multiple-choice question prompt (sub-question adaptive testing). For example, prompt 132 can be presented with a set of answer options including answer options 113A, 114A, and 115A. Selection of one of the answer options 113A, 114A, and 115A can be used as input to determine, which of answer options 116A, 117A, and 118A are to be presented in a subsequent set of answer options with prompt 132.

Pre-established rules include one or more question end conditions indicating when to end a multiple-choice question based on test taker input. For example, rules 151 can include one or more question end conditions indicating when to end questions in test 111. End conditions can include the selection of one or more correct or partially correct answer options, selection of a number of incorrect answer options, etc. Multiple question end conditions can be associated with a question.

Rules indicating the number of presented answer options, the staging of presented answer options, and including one or more end conditions can be used together to provide a test developer and/or test administrator with a high degree of control over test administration.

Figure 2A:
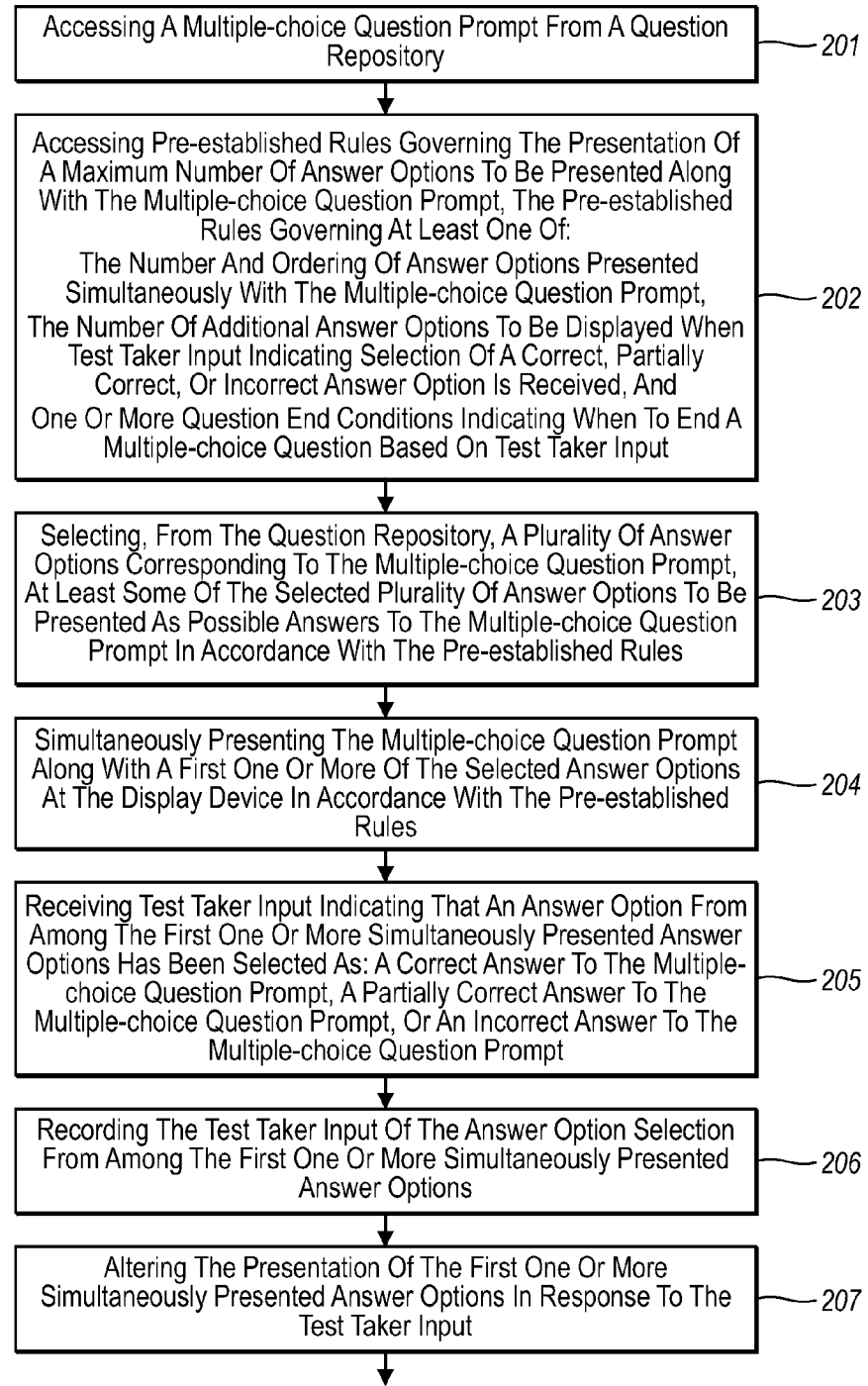
FIG. 2A illustrates a first portion of a flow chart of an example method for presenting a multiple-choice question during delivery of a computerized test
Figure 2B:
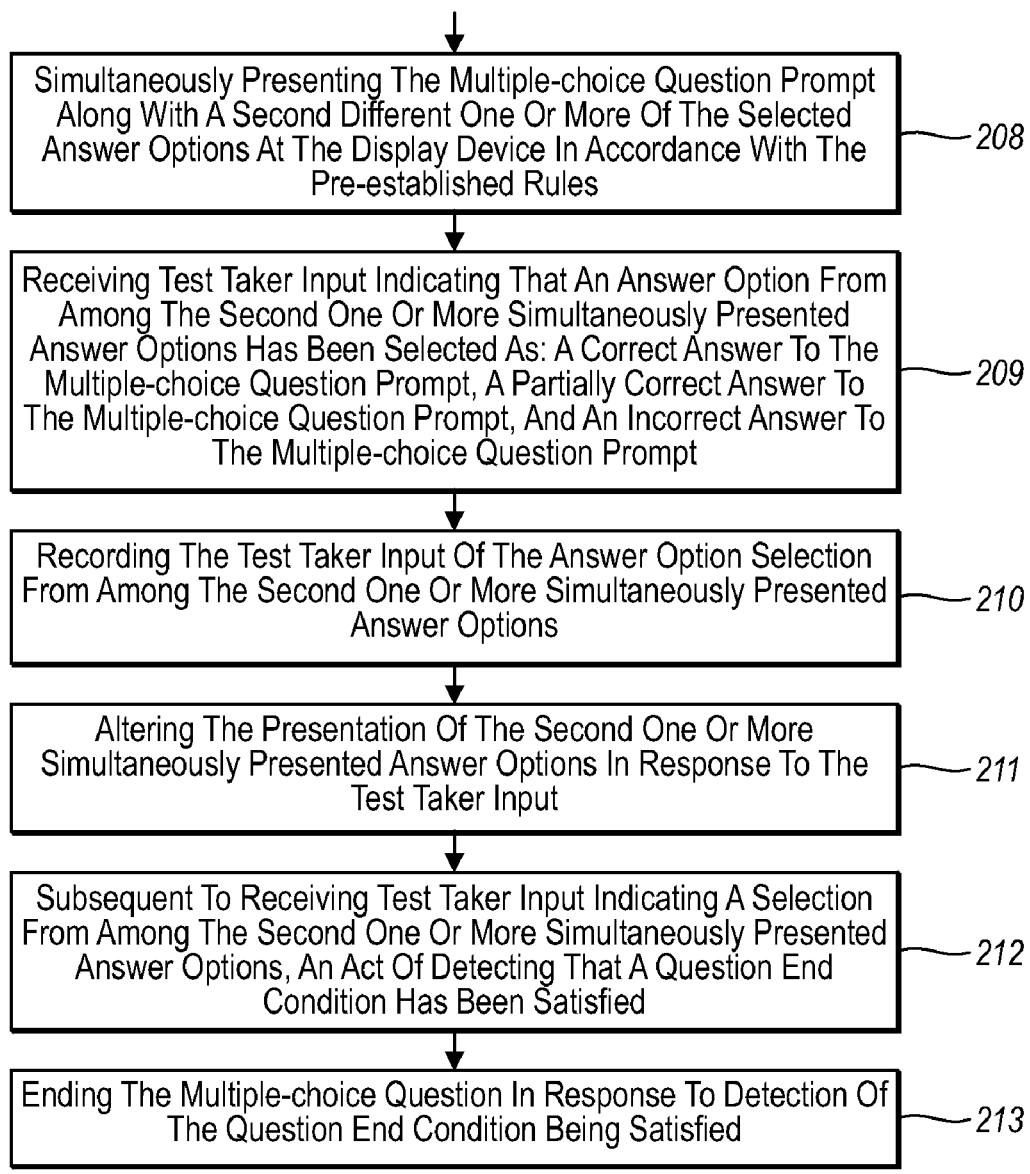
FIG. 2B illustrates a second portion of a flow chart of an example method for presenting a multiple choice question during delivery of a computerized test

FIG. 2 illustrates a flow chart of an example method 200 for presenting a multiple-choice question during delivery of a computerized test. Method 200 will be described with respect to the components and data in computer architecture 100.

In operation, it is determined that a multiple-choice question is to be presented to a test taker of the computerized test. For example, processor 103 can determine that question 112A is to be presented at display device 102. Pre-established rules (e.g., in rules 151) can be applied to determine that a multiple-choice question, including a multiple-choice question prompt and a plurality of corresponding answer options, is to be presented.

Method 200 includes an act of accessing a multiple-choice question prompt from a question repository (act 201). For example, processor 103 can access prompt 132A from storage 101.

Method 200 includes an act of accessing pre-established rules governing the presentation of a maximum number of answer options to be presented along with the multiple-choice question prompt (act 202). The pre-established rules govern at least one of: the number and ordering of answer options presented simultaneously with the multiple-choice question prompt, the number of additional answer options to be displayed when test taker input indicating selection of a correct, partially correct, or incorrect answer option is received, one or more question end conditions indicating when to end a multiple-choice question based on test taker input.

For example, processor 103 can access rules 151 governing the presentation of answer options to be presented along with prompt 132A. Rules 151 can govern at least one of: the number and ordering of answer options 113A, 114A, 115A, 116A, 17A, and 118A to be simultaneously presented with prompt 132A, the number of additional options form answer options 113A, 114A, 115A, 116A, 117A, and 118A to be displayed when test taker input indicating selection of a correct, partially correct, or incorrect answer option is received, and one or more question end conditions indicating when to end question 112A based on input from test taker 147.

Method 200 includes an act of selecting, from the question repository, a plurality of answer options corresponding to the multiple-choice question prompt, at least some of the selected plurality of answer options to be presented as possible answers to the multiple-choice question prompt in accordance with the pre-established rules (act 203). For example, processor 103 can identify answer options 113A, 114A, 115A, 116A, 117A, and 118A as possible answers to prompt 132A. Rules in rules 151 can be applied to select one or more of answer options 113A, 114A, 115A, 116A, 117A, and 118A to be presented with prompt 132A. Selection of answer options can include selecting many answer options and/or the maximum number of answer options that are presented simultaneously with prompt 132A

According to rules 151, selected answer options can be displayed individually or as a group of two or more answer options. Generally, processor 103 can display answer options or groups of answer options serially along with prompt 132A.

Method 200 includes an act of simultaneously presenting the multiple-choice question prompt along with a first one or more of the selected answer options at the display device in accordance with the pre-established rules (act 204). For example, processor 103 can access prompt 132A and answer options 113A, 117A, and 118A from storage 101. Processor 103 can then simultaneously present prompt 132 along with answer options 113A, 117A, and 118A at display device 102 in accordance with rules 151.

Figure 3:
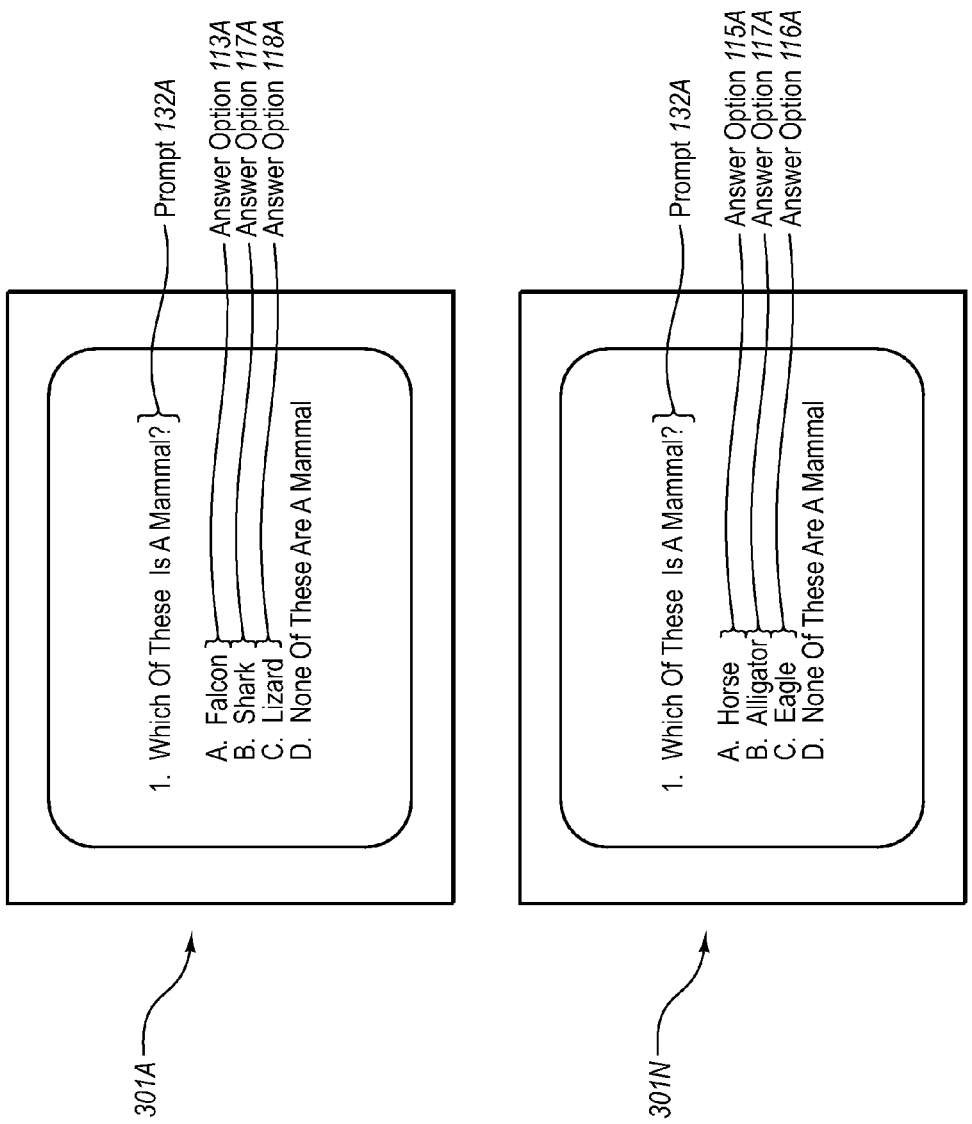
FIG. 3 illustrates example displays of a test question and corresponding answer options.

FIG. 3 illustrates example displays of test question prompt 132A and corresponding answer options. Display 301A (e.g., presented at display device 102) depicts prompt 132A presented simultaneously with answer options 113A, 117A, and 118A (a first one or more of the selected answer options). Display 301A also includes a default answer option (e.g., "none of these are a mammal") that can also be accessed from storage 101 or from another storage location.

Method 200 includes an act of receiving test taker input indicating that an answer option from among the first one or more simultaneously presented answer options has been selected as: a correct answer to the multiple-choice question prompt, a partially correct answer to the multiple-choice question prompt, or an incorrect answer to the multiple-choice question prompt (act 205). For example, processor 103 can receive test taker input 106 from input device 104 (e.g., a keyboard and/or mouse) indicating selection of an answer option presented in display 301A. Thus, test taker input 106 can indicate a selection or A, B, C, or D. Selection of A, B, or C can indicate selection of an incorrect answer to prompt 132A. Selection of D can indicate selection of a partially correct answer to prompt 132A.

Method 200 includes an act of recording the test taker input of the answer option selection from among the first one or more simultaneously presented answer options (act 206). For example, processor 103 can record test taker input 106 in results 181. Thus, test taker 147's scored input (correct, partially correct, or incorrect) is fixed and recorded. Accordingly, whether test taker input 106 indicated a correct, partially correct, or incorrect answer to prompt 132A can be stored in results 181.

Method 200 includes an act of altering the presentation of the first one or more simultaneously presented answer options in response to the test taker input (act 207). For example, processor 103 can alter the presentation of answer options in display 301A in response to test taker input 106. Altering the presentation of answer options in display 301A can include moving the answer options to different location with the displayable area (e.g., lower on the screen), removing the answer options from the screen, etc.

Method 200 includes an act of simultaneously presenting the multiple-choice question prompt along with a second different one or more of the selected answer options at the display device in accordance with the pre-established rules (act 208). Processor 103 can access answer options 115A, 117A, and 116A from storage 101. Processor 103 can simultaneously present prompt 132A along with answer options 115A, 117A, and 116A at display 102 in accordance with rules 151.

Referring back to FIG. 3, display 301N (e.g., presented at display device 102) depicts prompt 132A presented simultaneously with answer options 115A, 117A, and 116A (a second one or more of the selected answer options). Display 301N also includes the default answer option "none of these are a mammal" that can also be accessed from storage 101 or from another storage location.

Thus, the transition from 301A to 301N can be facilitated by referring to rules 151 and determining how to proceed based on selection of an answer from 301A. In the depicted embodiment of 301A, selection of A, B, C, or D facilitates a transition to 301N. However, scoring of the selection can be different based on the selected answer option. For example in 301A, a higher score can be given for selection of D and a lower score given for selection of A, B, or C.

In the depicted embodiments of 301A and 301N the answer options in 301A are partially retained for display in 301N. That is, answer option D is presented in both 301A and 301N. As previously described, the presentation of answer options when transitioning between groups of answer options can be subject to various different graphical alterations.

In some embodiments, processor 103 accesses question prompt 132A and answer options 115A, 117A, and 116A from storage 101 and implements the appropriate commands for displaying prompt 132A and answer options 115A, 117A, and 116A at display device 102. In alternate embodiments, prompt 132A can be retained at the display device 102. In these alternate embodiments, answer options 115A, 117A, and 116A are obtained from storage 101 and displayed at display 102 along with the retained prompt 132A.

Method 200 includes an act of receiving test taker input indicating that an answer option from among the second one or more simultaneously presented answer options has been selected as: a correct answer to the multiple-choice question prompt, a partially correct answer to the multiple-choice question prompt, and an incorrect answer to the multiple-choice question prompt (act 209). For example, processor 103 can receive test taker input 107 from input device 104 indicating selection of an answer option presented in display 301N. Thus, test taker input 107 can indicate a selection of A, B, C, or D. Selection of A can indicate selection of a correct answer to prompt 132A. On the other hand, selection of B, C, or D can indicate selection of an incorrect answer to prompt 132A.

Method 200 includes an act of recording the test taker input of the answer option selection from among the first one or more simultaneously presented answer options (act 210). For example, processor 103 can record test taker input 107 in results 181. Thus, the test taker 147's scored input (correct, partially correct, or incorrect) is fixed and recorded. For example whether test taker input 107 indicated a correct, partially correct, or incorrect answer to prompt 132A can be stored in results 181.

Method 200 includes an act of altering the presentation of the second one or more simultaneously presented answer options in response to the test taker input (act 211). For example, processor 103 can alter the presentation of answer options in display 301N in response to test taker input 107. Altering the presentation of answer options in display 301N can include moving the answer options to different location with the displayable area (e.g., lower on the screen), removing the answer options from the screen, graphical alterations, etc.

Method 200 includes subsequent to receiving test taker input indicating a selection from among the second one or more simultaneously presented answer options, an act of detecting that a question end condition has been satisfied (act 212). For example, based on test taker inputs 106 and/or 197, processor 103 can refer to rules 151 to determine that a question end condition for question 112A has been satisfied. End conditions associated with question 112A can include the selection of a correct answer, selection of two incorrect answers, or selection of a partially correct answer followed by selection of an incorrect answer.

Method 200 includes an act of ending the multiple-choice question in response to detection of the question end condition being satisfied (act 213). For example processor 103 can end question 111 in response to detecting the question end condition for question 111 being satisfied.

Embodiments of the present invention can include various other presentations of multiple-choice question prompts and corresponding answer options. Thus, it may be, for example, that the multiple-choice question:

Which is mammal?
  a. horse
  b. snake
  c. falcon
  d. mosquito
  e. shark

Is presented as a series of questions. Wherein the one question is:
  Is this a mammal?
    FALCON Yes No
  Followed by one or more of:
  Is this a mammal?
    SNAKE Yes No
  Is this a mammal?
    SHARK Yes No
  Is this a mammal?
    MOSQUITO Yes No
  Until the following question is presented:
  Is this a mammal?
    HORSE Yes No However, if YES is selected for any the questions prior to the HORSE answer option, the multiple-choice question can be terminated and a new question in the test presented. Alternately in other embodiments, one or more additional options may be displayed after it is determined if the answer is correct or incorrect so as to not provide an cues indicating the correctness or incorrectness of an answer.

Also, if the test taker answers all the incorrect options correctly, with NO answers, then the question may be terminated without displaying the correct option.

Also, an answer option may be presented twice for test security purposes.

Thus, embodiments of the present invention include presenting multiple-choice question prompts with answer options that are randomized, or selected using some algorithm, and presented one at a time or in groups with or without replacement. The test taker is required to respond to each answer option, indicating whether or not it is the correct answer. If the test taker indicates that an answer option is not the correct one, then another answer option can be presented. If the test taker indicates that an answer option is the correct one, then the question may end. A new question can then be presented. The number of answer options for a prompt is not revealed to test takers (even if he or she fails to indicate that any of them are the correct option).

Accordingly, embodiments of the invention for presenting multiple-choice answer options has several advantages, including reducing the effect of guessing, answer option comparison, and other test-taking strategies on test scores, reducing the effect of answer recognition (from former administrations of the test or via access to stolen test content) on test scores, is simpler for smaller children and individuals with cognitive disabilities, provides greater reliability, and offers greater test security by frustrating efforts to memorize test content by limiting or randomizing the test content displayed to a test-taker and increasing the number of variants of a question that could be presented to a test-taker. Staging of answer options also offers more efficient measurement; potentially reducing overall test length by allowing better prepared test-takers to move more quickly through a test.

Since answers options are presented individually or in groups of two or more, a test-taker must decide whether each answer option it correct or incorrect without knowing how many answer options are available, or seeing all of the answer options. Staging answer options therefore, frustrates guessing, comparison of answer options and other test-taking strategies.

Embodiments permit the authoring of multiple-choice questions with only one, two or three answer options, saving the time and effort to author incorrect answer options. For example, a test question could be deployed with only one answer option, the correct one; if a test-taker is unsure whether the answer option is correct or incorrect, they must indicate that the answer option is incorrect, at which point the question ends.

Embodiments permit multiple-choice questions to have dozens, even hundreds of answer options, most incorrect, many correct. This can make the questions unlimited in their long-term usefulness and security.

Embodiments permit reducing the cost of test development. Multiple-choice answer options can be added to existing multiple-choice questions, making test development efforts much simpler and less expensive.

Embodiments permit scoring questions as correctly answered even if a correct answer option is never presented to a test-taker. For example, rejection of a sufficient number of incorrect answer options may provide an ample basis to award a correct response using Item Response Theory (aka, "IRT") or another test scoring model. A multiple-choice question could also be ended without determining whether the question was answered correctly or incorrectly.

Test security is enhanced by limiting the expose of answer options and by randomizing answer options, frustrating efforts to memorize or record test content. For example, if a test-taker indicates that the correct answer option (or one of them) is incorrect, the question can be ended and scored; the remaining answer options are not displayed and therefore can't be memorized or recorded. Conversely, test question material that is memorized or recorded will be of limited use in a subsequent administration of the test when the test-taker is presented with a one or more different answer options, in a different order.

Test security is further enhanced by frustrating attempts to record (e.g., photograph) test questions since the answer options are never displayed on the computer screen at once, or at all, and because (depending on the test-taker responses and the question format) the correct answer option may never be displayed.

The presentation of the multiple-choice question prompt and a single answer option at a time makes better use of space on computer screens, decreasing for example, the need to scroll to view lengthy test questions, or allowing the use of enlarged text for vision-impaired test-takers. The staged multiple-choice question is also easier to read and understand because the amount of information on the computer screen is reduced, and because the task displayed on the screen (a single answer option) is simplified. This is particularly advantageous for children and individuals with cognitive disabilities.

The staged multiple-choice question makes it possible to refresh or update existing pools of multiple-choice test questions by introducing new answer options without having to author and publish new question prompts. Test creators can also produce substitute text for irrelevant text contained in a multiple-choice question prompt (e.g., fictitious names, places) which can be inserted into test questions according to a schedule not predictable by test-takers. Experimental answer options can also be "seeded" into existing questions on an non-scored basis, allowing test creators to collect data on the performance of those answer options.

Embodiments of the present invention can be used with multiple-correct multiple-choice question formats: A multiple-choice question prompt may have more than one correct answer option. The answer options are presented individually, but the test-taker may only be required to identify one correct answer option for the question to be scored correct. Alternatively, more than one correct response may be required.

In accordance with the present invention, modules including processors, displayed devices, and input devices, as well as associated data, including tests, questions, prompts, answer options, pre-established rules, test taker inputs, and results, can be stored and accessed from any of the computer-readable media associated with a computer system. When a mass storage device, such as, for example, storage 101, is coupled to a computer system, such modules and associated program data may also be stored in the mass storage device. In a networked environment, program modules relative to a computer system, or portions thereof, can be stored in remote memory storage devices, such as, system memory and/or mass storage devices associated with remote computer systems. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a display device, a method for presenting a multiple-choice test question including a question prompt and a plurality of answer options, during delivery of a computerized test, the method comprising the computer implemented acts of:
   accessing a question prompt from a multiple-choice question repository;
   accessing pre-established rules governing the presentation of a maximum number of answer options to be presented along with the question prompt, the pre-established rules governing at least one of:
      the number and ordering of answer options presented with the question prompt;
      the number of additional answer options to be displayed when test-taker input indicating an answer option as correct or incorrect is received; and
      one or more question end conditions indicating when to end a test question based on test-taker input;
   selecting, from the multiple-choice question repository, a plurality of answer options corresponding to the question prompt, at least some of the selected plurality of answer options to be presented as possible answers, at least one or more correct answer options and one or more incorrect answer options, to the question prompt in accordance with the pre-established rules;
   serially presenting a first one of the selected answer options along with the question prompt at the display device in accordance with the pre-established rules;
   receiving test-taker input indicating that the first presented answer option has been selected as a correct answer to the question prompt or an incorrect answer to the question prompt;
   recording the test-taker input indicating that the first presented answer option has been selected as a correct answer to the question prompt or an incorrect answer to the question prompt;
   serially presenting additional answer options from at least some of the selected plurality of answer options until detecting that a question end condition is satisfied in response to receiving test-taker input indicating that the first presented answer option has been selected as a correct answer to the question prompt or an incorrect answer to the question prompt including:
      an act of simultaneously presenting the question prompt along with a next selected answer option at the display device in accordance with the pre-established rules;
      an act of receiving test-taker input indicating that next presented answer option has been selected as a correct answer to the question prompt or an incorrect answer to the question prompt;
      an act of recording the test-taker input indicating that the next answer option has been selected as a correct answer to the question prompt or an incorrect answer to the question prompt;
   subsequent to receiving test-taker input indicating a response to the next presented answer option, an act of detecting that a question end condition has been satisfied; and
   an act of ending the test question in response to detection of the question end condition being satisfied.

2. The method as recited in claim 1, wherein the next selected answer option is randomly selected.

3. The method as recited in claim 1, wherein the next selected answer option is staged in accordance with a pre-defined selection algorithm for answer option selection.

4. The method as recited in claim 1, wherein the act of serially presenting additional answer options from at least some of the selected plurality of options until detecting that a question end condition is satisfied comprises an act of serially presenting one or more staged answer options based on analysis of the test-taker input indicating that one or more answer options from among previously presented answer options has/have been selected as: a correct answer or answers to the question prompt or an incorrect answer or answers to the question prompt.

5. The method as recited in claim 1, wherein the act of detecting that a question end condition has been satisfied comprises an act of detecting that test-taker input indicated that a plurality of the serially presented answer options have been selected as correct or incorrect answers to the question prompt.

6. The method as recited in claim 1, wherein the act of detecting that a question end condition has been satisfied comprises an act of detecting that test-taker input indicted the selection of a correct answer option from among the serially presented additional answer options.

7. The method as recited in claim 1, wherein the act of selecting, from the question repository, a plurality of answer options comprises an act of selecting one or more incorrect answer options and one or more correct answer options from an answer option pool.

8. The method as recited in claim 1, further including an act of altering the presentation of the presented answer option in response to receiving test taker input indicating that the presented answer option has been selected as a correct answer to the question prompt or an incorrect answer to the question prompt.

9. The method as recited in claim 8, wherein the act of altering the presentation of the presented answer option in response to the test-taker input comprises an act removing the presented answer option from the display device.

10. The method as recited in claim 8, wherein the act of altering the presentation of the presented answer option in response to the test-taker input comprises an act reducing the visual importance of the presented answer option on the display device.

11. A computer program product for use at a computer system including a display device, the computer program product for implementing a method for presenting a multiple-choice test question including a question prompt and a plurality of answer options during delivery of a computerized test, the computer program product comprising one or more physical computer-readable media having stored thereon computer-executable instructions that, when executed by a processor, cause the computer system to perform the method including the following:

access a question prompt from a multiple-choice question repository;

access pre-established rules governing the presentation of a maximum number of answer options to be presented along with the question prompt, the pre-established rules governing at least one of:

the number and ordering of answer options presented with the question prompt;

the number of additional answer options to be displayed when test-taker input indicating an answer option as correct or incorrect is received; and one or more question end conditions indicating when to end a test question based on test-taker input;

select, from the multiple-choice question repository, a plurality of answer options corresponding to the question prompt, at least some of the selected plurality of answer options to be presented as correct or incorrect answer options to the question prompt in accordance with the pre-established rules;

serially present a first one of the selected answer options along with the question prompt at the display device in accordance with the pre-established rules;

receive test-taker input indicating that presented answer option has been selected as a correct answer to the question prompt or an incorrect answer to the question prompt;

record the test-taker input indicating that the first presented answer option has been selected as a correct answer to the question prompt or an incorrect answer to the question prompt;

serially present additional answer options from the at least some of the selected plurality of answer options until detecting that a question end condition is satisfied in response to receiving test-taker input indicating that the first presented answer option has been selected as a correct answer to the question prompt or an incorrect answer to the question prompt including:

simultaneously present the question prompt along with a next selected answer option at the display device in accordance with the pre-established rules;

receive test-taker input indicating that next presented answer option has been selected as a correct answer to the question prompt or an incorrect answer to the question prompt;

record the test-taker input indicating that the next answer option has been selected as a correct answer to the question prompt or an incorrect answer to the question prompt;

subsequent to receiving test-taker input indicating a response to the next presented answer option, detect that a question end condition has been satisfied; and end the test question by removing the question prompt and the currently presented option in response to detection of the question end condition being satisfied.

12. The computer program product as recited in claim 11, wherein computer-executable instructions, that when executed, cause the computer system to serially present additional answer options from at least some of the selected plurality of answer options along with the question prompt at the display device in accordance with the pre-established rules comprise computer-executable instructions, that when executed, cause computer system to serially present one or more randomly selected answer options.

13. The computer program product as recited in claim 11, wherein computer-executable instructions, that when executed, cause the computer system to serially present additional answer options from at least some of the selected plurality of answer options comprise computer-executable instructions, that when executed, cause computer system to serially present one or more answer options staged in accordance with a predefined selection algorithm for answer option selection.

14. The computer program product as recited in claim 11, wherein computer-executable instructions, that when executed, cause the computer system to serially present additional answer options from at least some of the selected plurality of options until detecting that a question end condition is satisfied comprise computer-executable instructions, that when executed, cause the computer system to serially present one or more staged answer options based on analysis of test-taker input indicating that an answer option from among previously presented answer options has been selected as: a correct answer to the multiple-choice question prompt or an incorrect answer to the multiple-choice question prompt.

15. The computer program product as recited in claim 11, wherein computer-executable instructions, that when executed, cause the computer system to detect that a question end condition has been satisfied comprise computer-executable instructions, that when executed, cause the computer system to detect that test-taker input indicated that a plurality of the serially presented answer options have been selected as correct or incorrect answers to the question prompt.

16. The computer program product as recited in claim 11, wherein computer-executable instructions, that when executed, cause the computer system to detect that a question end condition has been satisfied comprise computer-executable instructions, that when executed, cause the computer system to detect that test-taker input indicated the selection of a correct answer option from among the serially presented additional answer options.

17. A computer system, comprising:
one or more processors:
system memory; and
one or more physical computer-readable media having stored thereon computer-executable instructions that, when executed by a processor, cause the computer system to present a multiple-choice test question including a question prompt and a plurality of answer options, including the following:
access a question prompt from a multiple-choice question repository;
access pre-established rules governing the presentation of a maximum number of answer options to be presented along with the question prompt, the pre-established rules governing at least one of:

the number and ordering of answer options presented with the question prompt;

the number of additional answer options to be displayed when test-taker input indicating an answer option as corrector incorrect is received; and one or more question end conditions indicating when to end a test question based on test-taker input;

select, from the multiple-choice question repository, a plurality of answer options corresponding to the question prompt, at least some of the selected plurality of answer options to be presented as possible answers to the question prompt in accordance with the pre-established rules;

serially present a first one of the selected answer options along with the question prompt at the display device in accordance with the pre-established rules;

receive test-taker input indicating that the first presented answer option has been selected as a correct answer to the question prompt or an incorrect answer to the question prompt;

record the test-taker input indicating that the first presented answer option has been selected as a correct answer to the question prompt or an incorrect answer to the question prompt;

serially present additional answer options from the at least some of the selected plurality of answer options until detecting that a question end condition is satisfied in response to receiving test-taker input indicating that the first presented answer option has been selected as a correct answer to the question prompt or an incorrect answer to the question prompt including;

simultaneously present the question prompt along with a next selected answer option at the display device in accordance with the pre-established rules;

receive test-taker input indicating that the next presented answer option has been selected as a correct answer to the question prompt or an incorrect answer to the question prompt;

record the test-taker input indicating that the next answer option has been selected as a correct answer to the question prompt or an incorrect answer to the question prompt;

subsequent to receiving test-taker input indicating a response to the next presented answer option, detect that a question end condition has been satisfied; and end the test question in response to detection of the question end condition being satisfied.

\* \* \* \* \*